(12) United States Patent
Malik

(10) Patent No.: US 7,912,469 B2
(45) Date of Patent: Mar. 22, 2011

(54) SYSTEM AND METHOD FOR DEPLOYMENT OF A WIRELESS INFRASTRUCTURE

(75) Inventor: Ajay Malik, San Jose, CA (US)

(73) Assignee: Symbol Technologies, Inc., Holtville, NY (US)

( * ) Notice: Subject to any disclaimer, the term of this patent is extended or adjusted under 35 U.S.C. 154(b) by 701 days.

(21) Appl. No.: 11/876,529

(22) Filed: Oct. 22, 2007

(65) Prior Publication Data
US 2008/0288623 A1    Nov. 20, 2008

Related U.S. Application Data

(60) Provisional application No. 60/938,561, filed on May 17, 2007.

(51) Int. Cl.
*H04W 16/18* (2009.01)

(52) U.S. Cl. ............... 455/446; 455/67.14; 455/424; 455/454; 370/338

(58) Field of Classification Search .............. None
See application file for complete search history.

(56) References Cited

U.S. PATENT DOCUMENTS

| 5,564,121 | A  | * | 10/1996 | Chow et al. ........... 455/446 X |
| 6,718,172 | B1 | * | 4/2004  | Cook et al. ........... 455/446 X |
| 7,035,642 | B2 | * | 4/2006  | Rappaport et al. ....... 455/446 |
| 7,174,175 | B2 | * | 2/2007  | Uang et al. ............ 455/462 |

* cited by examiner

*Primary Examiner* — Philip J Sobutka

(57) ABSTRACT

A method is used for deployment of a wireless infrastructure. The method comprises deploying a plurality of access ports in a facility based on a layout that depends on a type of the facility. The method comprises receiving at least one parameter from at least one of the plurality of access points. The method comprises dynamically determining settings of the plurality of access points based on the at least one parameter.

22 Claims, 4 Drawing Sheets

US 7,912,469 B2

SYSTEM AND METHOD FOR DEPLOYMENT OF A WIRELESS INFRASTRUCTURE

PRIORITY CLAIM

This application claims the priority to the U.S. Provisional Application Ser. No. 60/938,561, entitled "Deployment of a Wireless Infrastructure," filed May 17, 2007. The specification of the above-identified application is incorporated herewith by reference.

FIELD OF THE INVENTION

The present invention relates generally to a deployment of a wireless infrastructure. Specifically, the deployment of the wireless infrastructure entails placement of network components in strategic locations.

BACKGROUND

In order to deploy a wireless infrastructure, prerequisites are necessary. For example, site surveys by qualified individuals are taken to examine the location in which the network is to be disposed. In another example, planning software is necessary. Planning software also requires qualified individuals to examine the location or have full knowledge about construction material and/or floor plans in which the network is to be disposed. These qualified individuals may use the planning software and the site survey to determine strategic locations to place thin access ports so that an efficient wireless infrastructure for the switched network may be established. However, the use of site surveys and/or planning software is costly. In addition, planning software may be ineffective to determine the strategic locations of access points in a volume space (3-dimensions) (e.g., multiple floors) due to the complexity.

SUMMARY OF THE INVENTION

The present invention relates to a system and method for deployment of a wireless infrastructure. The method comprises deploying a plurality of access ports in a facility based on a layout that depends on a type of the facility. The method comprises receiving at least one parameter from at least one of the plurality of access points. The method comprises dynamically determining settings of the plurality of access points based on the at least one parameter.

DETAILED DESCRIPTION

Figure 1:
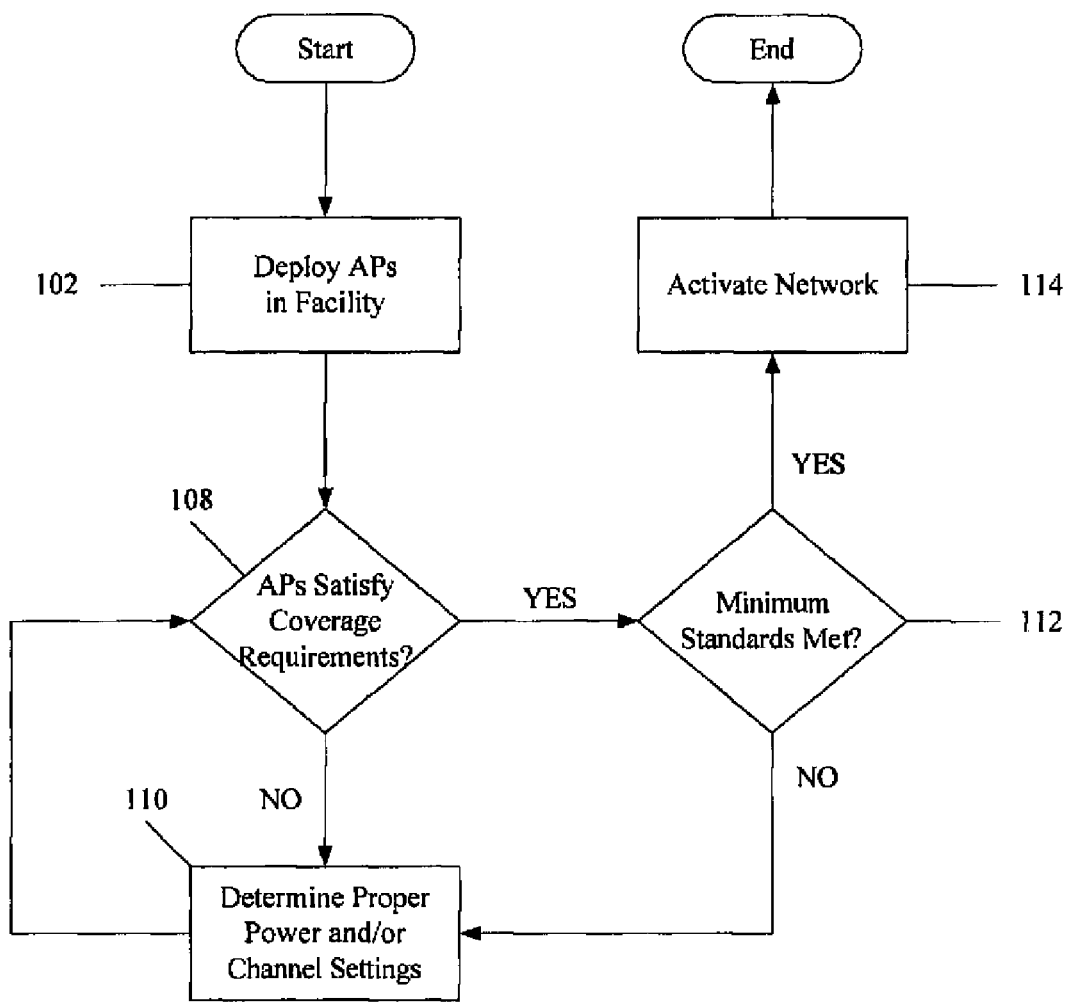
FIG. 1 shows an exemplary method of deploying a wireless infrastructure according to an exemplary embodiment of the present invention.

The exemplary embodiments of the present invention may be further understood with reference to the following description and the appended drawings, wherein like elements are referred to with the same reference numerals. The exemplary embodiments of the present invention describe a method for deploying and testing a wireless infrastructure. According to the exemplary embodiments of the present invention, the wireless infrastructure may be deployed without conventional requirements to successfully enable a network environment. The exemplary wireless infrastructure and exemplary deployment methods will be discussed in more detail below.

FIG. 1 shows an exemplary method 100 of deploying a wireless infrastructure according to an exemplary embodiment of the present invention. The method 100 will be described with reference to FIGS. 2a-b, FIGS. 3a-c, and FIGS. 4a-b. The method 100 allows a user to set up a wireless network with little to no preparatory data such as site surveys and planning software.

In step 102, access ports (APs) are deployed in a facility. The wireless network may be, for example, a switched wireless network. That is, the network may be maintained using a switch. The switch may be responsible for directing an exchange of data within the network. In this embodiment, the APs may be thin APs. Thin APs may merely relay any data that is incoming/outgoing to the switch. A published guideline may provide a layout for the deployment of the APs depending on the type of facility. The published guideline may include a set of layouts. The set of layouts may be an individual layout, multiple layouts, etc. for each type of facility. Those skilled in the art will understand that the present invention is not limited to a switched wireless network or thin APs and these devices are used only for illustrative purposes. For example, the APs could be fully functional APs within a non-switched wireless network.

The layout of APs may be in a variety of configurations. For example, the configuration of APs may be in the form of a grid such as nine APs forming a 3×3 grid, 12 APs forming a 3×4 grid, 15 APs forming a 3×5 grid, etc. depending on the type of facility. Thus, an example for the configuration of APs may indicate, for example, to place an 802.11 radio every 40 feet for extensive voice usage in the facility, to place an 802.11 radio every 60 feet for a regular office space, etc. Exemplary configurations will be described with reference to FIGS. 3a-c. It should be noted that the use of APs is used to indicate points in which the network may be extended beyond the capabilities of a single server, etc. That is, those skilled in the art will understand that the APs shown in FIGS. 3a-c may also be other devices that extend the coverage area of the network. For example, the term "radio" may be used as a generic identifier of the devices that extend the coverage area of the network.

Figure 3A:
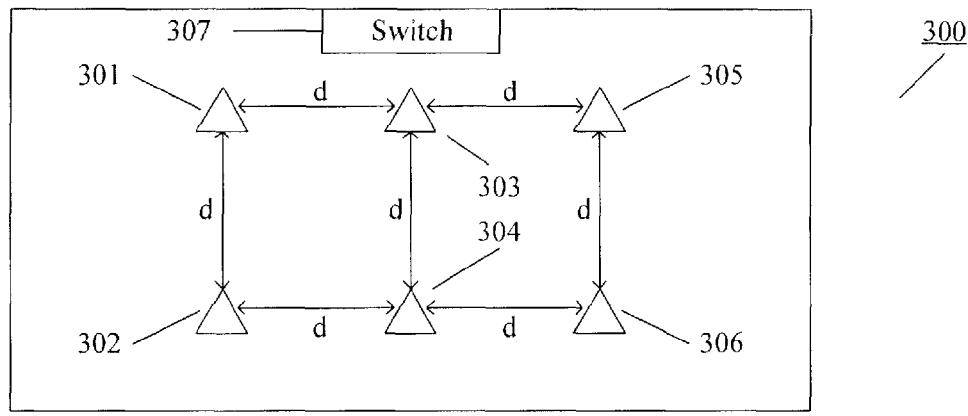
FIG. 3a shows a first deployment of access ports according to an exemplary embodiment of the present invention.

FIG. 3a shows a first deployment 300 of APs according to an exemplary embodiment of the present invention. For example, in a warehouse, the layout may include six APs 301-306 in a 2×3 grid configuration. As shown, APs 301, 302 constitute a first column, APs 303, 304 constitute a second column, and APs 305, 306 constitute a third column. In addition, APs 301, 303, 305 constitute a first row and APs 302, 304, 306 constitute a second row. Also, as shown, the APs 301-306 are equidistant from a neighboring AP. That is, for example, AP 301 is a distance d from APs 302, 303; AP 303 is a distance d from APs 301, 305, 304, etc. The distance d may be, for example, 50', 75', etc. The first deployment 300 also includes a switch 307 disposed within the facility towards an edge. The location of the switch 307 is only exemplary and the switch 307 may be located in other positions, as will be discussed below. This is a first exemplary configuration provided for the placement of APs.

Figure 3B:
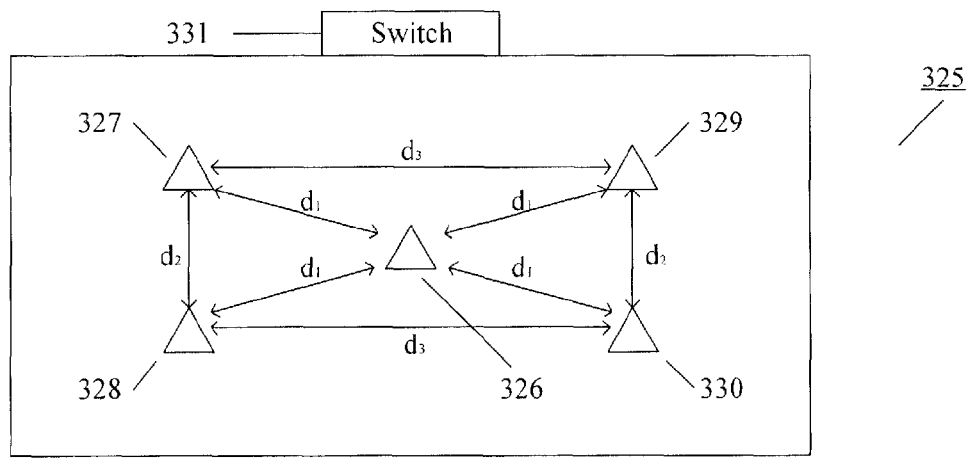
FIG. 3b shows a second deployment of access ports according to an exemplary embodiment of the present invention.

FIG. 3b shows a second deployment 325 of APs according to an exemplary embodiment of the present invention. For example, in a warehouse, the layout may include five APs 326-330. The configuration of the deployment 325 has a central AP 326 with the other four APs creating a substantial rectangle around the AP 326. As shown, APs 327, 328 constitute a first column and APs 329, 330 constitute a second column. In addition, APs 327, 329 constitute a first row and APs 328, 330 constitute a second row. In contrast to the first deployment 300, the deployment 325 shows that the APs may be different distances while maintaining a common distance with a central AP. That is, for example, AP 327 is a distance d2 from AP 328 while a distance d3 from AP 329; AP 330 is a distance d2 from AP 329 while a distance d3 from AP 328. The distance d2 may be, for example, 50', 75', etc. The distance d3 may be, for example, 75', 100', etc. As illustrated, the distance d3 is greater than the distance d2. Furthermore, the APs 327-330 is a distance d1 from the central AP 326. The distance d1 may be, for example, 50', 75', etc. The second deployment 325 also includes a switch 331 disposed outside the facility. The location of the switch 331 is only exemplary and the switch 331 may be located in other positions, such as described in the first deployment 300 and as will be discussed below. This is a second exemplary configuration provided for the placement of APs.

Figure 3C:
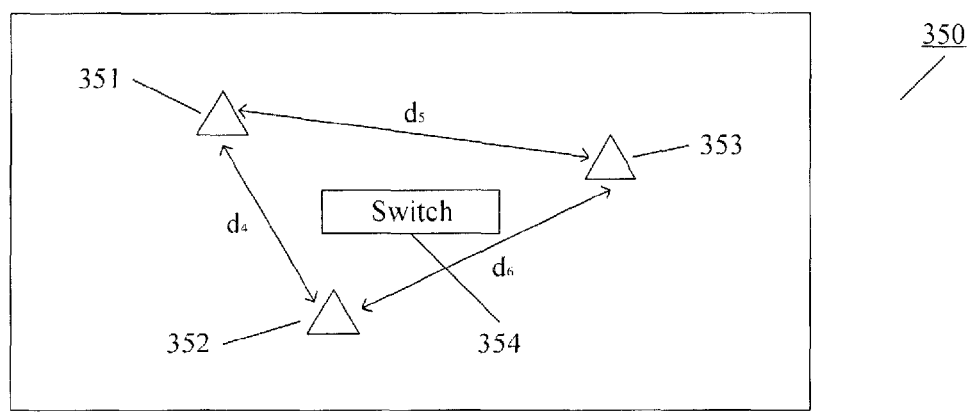
FIG. 3c shows a third deployment of access ports according to an exemplary embodiment of the present invention.

FIG. 3c shows a third deployment 350 of APs according to an exemplary embodiment of the present invention. For example, in a warehouse, the layout may include three APs 351-353. The configuration of the deployment 350 is substantially random. As shown, the APs 351-353 are disposed at random locations within the warehouse. In contrast to the first deployment 300 and the second deployment 325, the deployment 350 shows that the APs may all be at different distances from one another. That is, for example, AP 351 is a distance d4 from AP 352 while a distance d5 from AP 353; AP 352 is a distance d6 from AP 353. The distance d4 may be, for example, 40', 60', etc. The distance d5 may be, for example, 100', 125', etc. The distance d6 may be, for example, 75', 100', etc. The third deployment 350 also includes a switch 354 disposed within the facility towards a center position. The location of the switch 354 is only exemplary and the switch 354 may be located in other positions, as discussed above with reference to the first deployment 300 and the second deployment 325. This is a third exemplary configuration provided for the placement of APs.

Figure 4A:
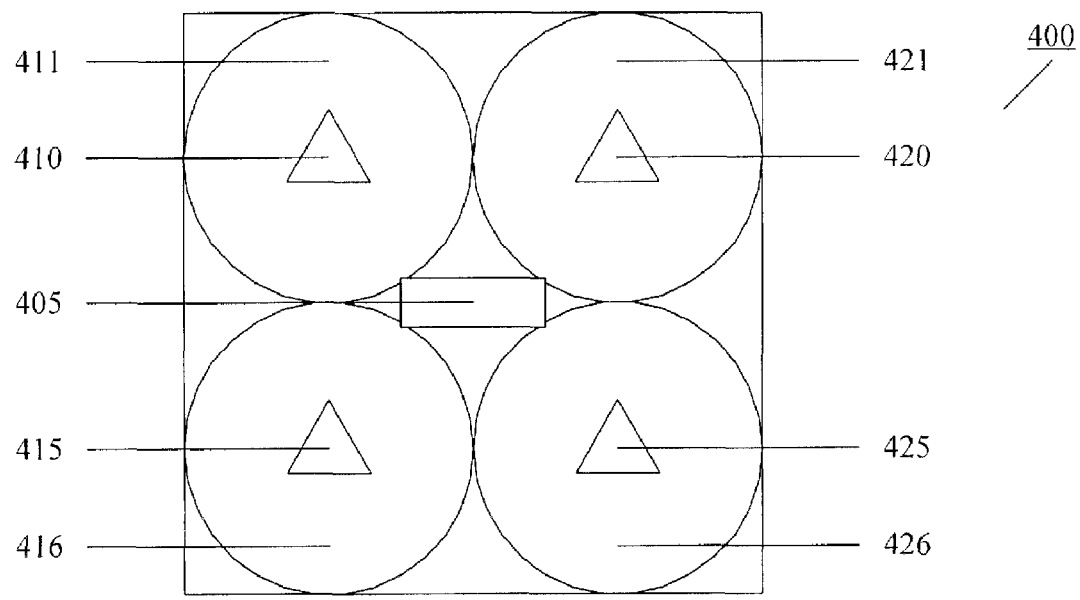
FIG. 4a shows an initial deployment of access ports according to an exemplary embodiment of the present invention.

FIG. 4a shows an initial deployment 400 of APs 410, 415, 420, 425 according to an exemplary embodiment of the present invention. Specifically, the initial deployment may be a fourth exemplary deployment of the APs 410, 415, 420, 425. In the initial deployment 400, the APs 410, 415, 420, 425 are arranged in a 2×2 grid. A switch 405 is disposed in a center of the deployment. The APs 410, 415, 420, 425 may be equidistant from neighboring APs. For example, AP 410 may be equidistant from AP 415 and 420. Furthermore, the APs 410, 415, 420, 425 may be equidistant from the centrally located switch 405. The initial deployment 400 will be further described below.

It should be noted that, although not shown in the drawings, those skilled in the art will understand that one or more of the APs may be connected to the respective switch. For example, the APs 351-353 may be hard-wired into the switch 354. In another example, only AP 351 may be connected to the switch 354. The other APs 352-353 may be connected to the AP 351. Those skilled in the art will also understand that the switch (e.g., switch 307, 331, 351) may be a network device arranged to perform a transparent bridge at a maximum speed capability of the hardware.

Referring back to FIG. 1, upon deploying the APs, the method 100 continues to step 108. In step 108, a determination is made whether the configuration satisfies coverage requirements for the proposed network. That is, once the APs are placed according to the layout in the published guideline, the APs may communicate with one another using initial power and channel settings to determine various parameters related to the wireless network. For example, the APs may determine their neighboring APs and the signal strengths that exist throughout the network. In another example, the APs may determine if there is a gap in coverage within the network area, e.g., an AP cannot communicate with a neighboring AP. The determination may be made, for example, by a wireless switch (e.g., switch 307, 331, 351).

Figure 2A:
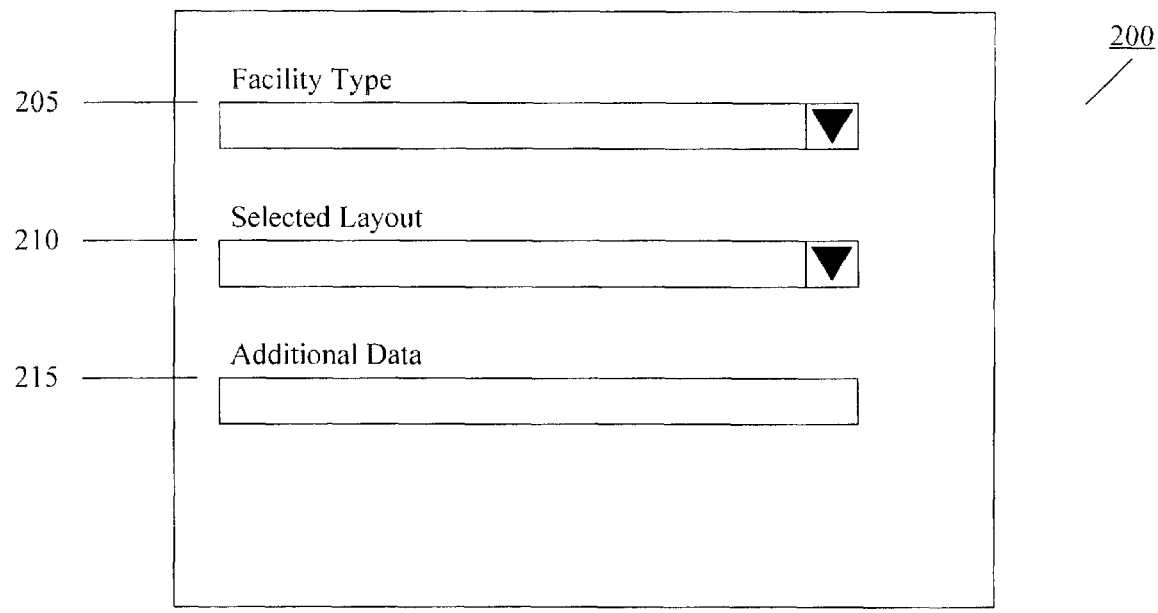
FIG. 2a shows a first input screen according to an exemplary embodiment of the present invention.

The determination may be made with consideration of other factors. For example, these other factors may be entered into a program by the administrator. FIG. 2a show a first input screen 200 according to an exemplary embodiment of the present invention. The screen 200 includes various input fields. For example, the input field 205 may indicate the type of facility. The input field 210 may indicate the selected layout for the type of facility. In one embodiment, the administrator may be restricted from entering the input field 210 until the input field 205 has been entered. The screen 200 also includes the input field 215 which indicates additional data that represents the other factors to be considered. This additional data may pertain to, for example, the extent of voice and/or data applications and the respective usage (e.g., heavy use, light use, etc.), the anticipated number of MUs to be disposed in the network, etc.

If the step 108 determines that the placement of APs does not satisfy the coverage requirements for the proposed network, the method 100 continues to step 110. For example, with reference to FIG. 4a, the APs 410, 415, 420, 425 each include an operating area 411, 416, 421, 426, respectively. As illustrated, the operating areas 411, 416, 421, 426 may be substantially circular as the operating areas radiate from the respective AP. Furthermore, the operating areas 411, 416, 421, 426 may refer to an area in which an MU disposed therein may connect to the wireless network. The APs 410, 415, 420, 425 may be operating at an initial setting (e.g., power, channel, etc.). The initial setting results in the operating areas 411, 416, 421, 426 for each AP 410, 415, 420, 425, respectively. The initial settings for the APs 410, 415, 420, 425 result in coverage gaps for the proposed network. In particular, the coverage gaps may be disposed at corners of the network and substantially near the switch 405.

In step 110, proper power and/or channel settings are determined to satisfy the coverage requirements. For example, referring to FIG. 4a, a combination of the operating areas 411, 416, 421, 426 create the coverage gaps in the network. Thus, a proposed change is to increase the power setting for each of the APs 410, 415, 420, 425 so that each of the APs 410, 415, 420, 425 has enough power to send/receive signals to cover the gaps (e.g., increase power to cover more area). In another example, the channel in which the APs operate may be altered to satisfy the coverage requirements. With reference to FIG. 4a, the APs 410, 415, 420, 425 may be operating on channel 6. However, an analysis of the network may indicate that the use of channel 6 creates static for voice applications. Thus, a proposed change is to use channel 5 to improve a quality for the voice applications. Once the appropriate power and/or channel settings are determined, the method 100 returns to step 108 where another determination is made whether the APs satisfy the coverage requirements for the network. Those skilled in the art will understand that the step 110 may be repeated if the APs do not satisfy the coverage requirements. That is, if an initial determination of a change in power and/or channel settings fails to satisfy the coverage requirements, a second determination is made to alter the initial determination. It should be noted that the use of power and channel settings is only exemplary. Those skilled in the art will understand that other parameters may also be altered.

Figure 4B:
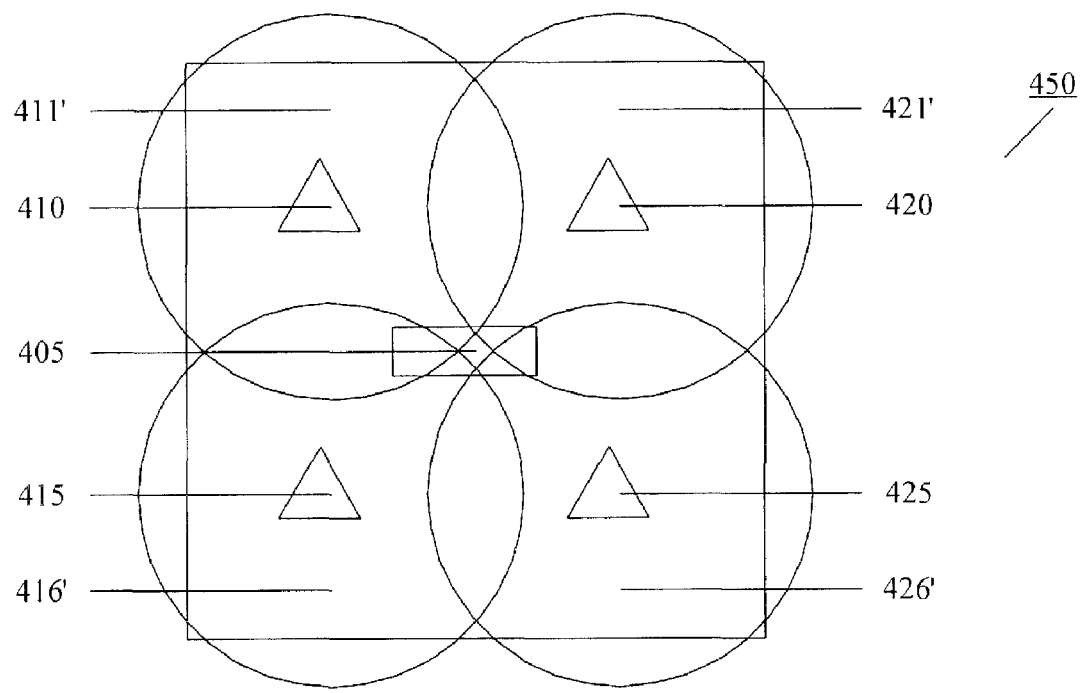
FIG. 4b shows a modified deployment of access ports from the initial deployment of FIG. 4a according to an exemplary embodiment of the present invention.

Referring again to FIG. 4a, the initial deployment 400 may be modified. FIG. 4b shows a modified deployment 450 of the APs 410, 415, 420, 425 from the initial deployment 400 of FIG. 4a according to an exemplary embodiment of the present invention. The modified deployment 450 determined that the location of each AP is satisfactory and that a change in power and channel settings would satisfy the coverage requirements. Thus, the APs 410, 415, 420, 425 may operate at a modified power setting resulting in operating areas 411', 416', 421', 426'. As illustrated, the operating areas 411', 416', 421', 426' cover the gaps that were creating from the initial operating areas 411, 416, 421, 426. It should be noted that the modified operating areas may go beyond an area of the facility in which the network is to be disposed. Furthermore, the channels in which the APs 410, 415, 420, 425 operate may be altered to channel 5. A determination may indicate that the use of channel 5 results in an improved use for voice applications.

It should be noted that the steps 108 and 110 may be combined into a single step. For example, upon deployment of the APs in step 102, the wireless switch may run a dynamic AP power and channel determination algorithm. This process may be automatic or dictated by an administrator. The APs may attempt to transmit/receive signals. Each AP may also attempt to establish a wireless client session with the other APs. Consequently, data such as an AP-to-AP beacon table, received signal strength indication (RSSI), signal-to-noise ratio (SNR), a retry count for each AP to another AP, etc. may be collected. Using this data, dynamic AP power and channel determination algorithms may select proper power and channel settings for each AP.

Figure 2B:
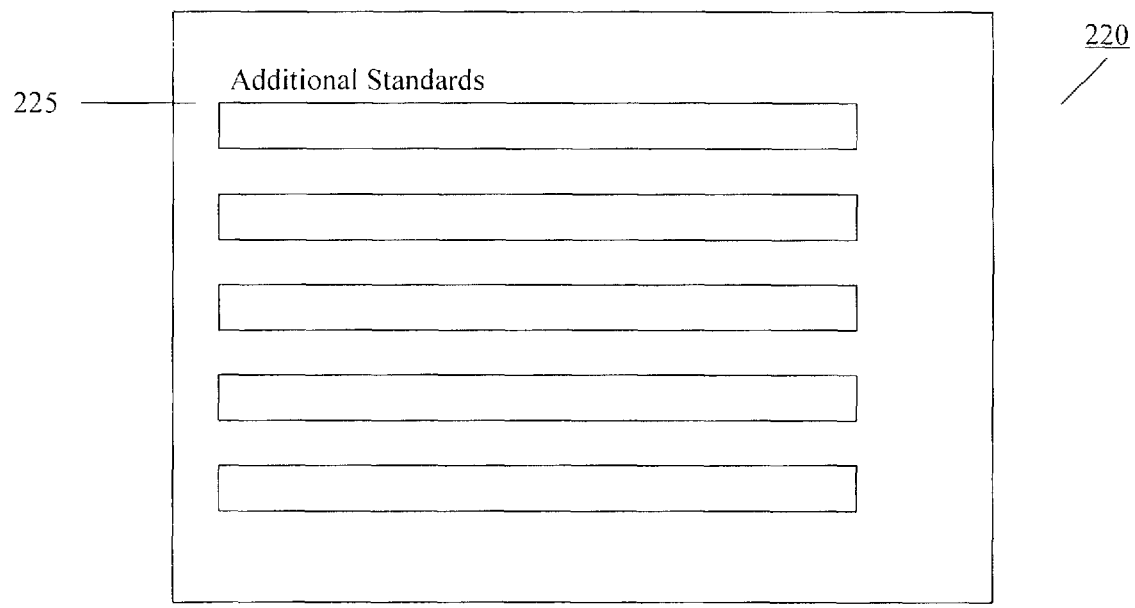
FIG. 2b shows a second input screen according to an exemplary embodiment of the present invention.

Once the APs satisfy the coverage requirements for the network (i.e., step 108), the method 100 continues to step 112. In step 112, a determination is made whether a minimum standard for additional parameters are met. FIG. 2b shows a second input screen 220 according to an exemplary embodiment of the present invention. The screen 220 includes an input 225 that allows the user to enter additional operating standards or requirements to which the network is to operate. For example, a desired standard for the network is for wireless devices disposed within the network to be connected at least at a certain rate (e.g., 54 Mbps). Another example of an operating requirement may be that the user desires that quality of service (QoS) voice communications are supported. It should be noted that the additional operating requirements may affect both the layout and the settings of the APs (steps 108-112). Thus, using the configuration previously determined and the power and channel settings in step 110 or initial settings, the determination may be made. If step 112 determines that the minimum standards are not met, the method returns to step 110 to determine another power and/or channel settings that would additionally satisfy the minimum standards. However, when the method returns to step 110, the method first determines if the new power and/or channel settings satisfy the coverage requirements set out in step 108.

For example, with reference to the modified deployment 450 of APs of FIG. 4b, the modified deployment 450 may satisfy the minimum standards that were entered. That is, the increased power setting and the change to channel 5 may also satisfy the minimum standards. In another example, the modified deployment 450 may not satisfy the minimum standards. One of the minimum standards may be a predetermined level of connectivity. The operating areas 411', 416', 421', 426' may result in the predetermined level of connectivity for MUs disposed closer to the APs 410, 415, 420, 421. However, outlying MUs may result in a lower level of connectivity than the predetermined level. Thus, a proposed change is to further increase the power setting of the APs 410, 415, 420, 425.

It should be noted that the steps 108-112 may be combined into a single step to determine power and/or channel settings using a substantially similar process described above with reference to the combination of steps 108-110. It should also be noted that other parameters of the AP may be set to accomplish the goals based on the input data. For example, specific authentication or association procedures may be set, etc. The exemplary steps 108-112 may be performed by the APs themselves, by a wireless switch to which the APs are connected, or by another network device such as a network server, network appliance, etc. In the case where the AP is a thin client, it is more likely that the control of the power, channel settings, etc. will be made by a separate device such as a wireless switch. Once the APs satisfy the coverage requirements and the minimum standards, the method continues to step 114. In step 114, the wireless network is activated.

It should also be noted that the method 100 may include additional steps to cover the contingencies for additional problems that may occur while setting up the network. For example, once a determination is made in step 110 for power and/or channel settings, a determination may be made if the current configuration of APs allows the coverage requirements and/or the minimum standards to be met. If the configuration can meet the requirements and/or standards, the method 100 would return to step 108. However, in a case where the configuration cannot satisfy the requirements and/or standards, the method 100 may return to step 106 where another configuration is ascertained. Furthermore, the method 100 may determine that different types of APs may be necessary to accomplish the requirements and/or standards. For example, the 802.11 radios may be inadequate for the facility and may require stronger radios, etc.

Furthermore, it should be noted that the use of the APs disposed within the facility is only exemplary. There may arise situations where the disposition of APs within the facility cannot satisfy the requirements and/or standards. Therefore, a possible solution is to locate the APs outside the perimeter of the facility (e.g., where coverage of a loading dock is required by the user). Thus, the method 100 may incorporate a configuration where the APs are disposed within the facility, outside the facility, or a combination thereof.

Thus, the exemplary embodiments of the present invention provide for a simplified manner of laying out and initializing a wireless network without the costs of a site survey. The exemplary embodiments also provide a user with an optimized wireless network with a proper number and location of APs or other wireless devices.

Those skilled in the art will understand that the above described exemplary embodiments may be implemented in any number of manners, including as a separate software module, as a combination of hardware and software, etc. For example, the method 100 may be a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    deploying a plurality of access ports in a facility using a published layout configuration that depends on a type of the facility, wherein the layout is selected from a set of published layouts;
    receiving at least one parameter from at least one of the plurality of access points; and
    dynamically determining settings of the plurality of access points based on the at least one parameter.

2. The method of claim 1, wherein the settings include a channel setting.

3. The method of claim 1, wherein the set of layouts include different grid configurations for each type of the facility.

4. The method of claim 1, wherein the access points are deployed equidistant from each other.

5. The method of claim 1, further comprising:
    deploying a switch managing the plurality of access ports, wherein the switch is equidistant from the access points.

6. The method of claim 1, wherein deploying includes selecting a layout dependent on an anticipated usage of the network.

7. The method of claim 1, wherein the layout can include an access point outside of the facility.

8. The method of claim 1, further comprising:
    altering the channel settings of the plurality of access points to close network coverage gaps.

9. The method of claim 1, further comprising determining whether the network meets a minimum standard for additional parameters related to at least one of an extent of a voice application, an extent of a data application, an amount of use for the voice application, an amount of use for the data application, and an anticipated number of mobile units connecting to the plurality of access ports.

10. The method of claim 1, further comprising determining whether the network meets a minimum standard for a level of connectivity.

11. The method of claim 10, wherein the level of connectivity relates to a connection rate.

12. A system, comprising:
    a plurality of access points deployed in a facility using a published layout configuration that depends on a type of the facility, wherein the layout is selected from a set of published layouts; and
    a wireless switch receiving at least one parameter from at least one of the plurality of access points, the wireless switch dynamically determining settings of the plurality of access points based on the at least one parameter.

13. The system of claim 12, wherein the settings include a channel setting.

14. The system of claim 12, wherein the set of layouts include different grid configurations for each type of the facility.

15. The system of claim 12, wherein the access points are deployed equidistant from each other.

16. The system of claim 12, deploying includes selecting a layout dependent on an anticipated usage of the network.

17. The system of claim 12, wherein the layout can include an access point outside of the facility.

18. The system of claim 12, wherein the switch alters the channel settings of the plurality of access points to close network coverage gaps.

19. The system of claim 12, further comprising determining whether the network meets a minimum standard for additional parameters relate to at least one of an extent of a voice application, an extent of a data application, an amount of use for the voice application, an amount of use for the data application, and an anticipated number of mobile units connecting to the plurality of access ports.

20. The system of claim 12, wherein the switch determines whether the network meets a minimum standard for a level of connectivity.

21. The system of claim 20, wherein the level of connectivity relates to a connection rate.

22. A computer readable storage medium including a set of instructions executable by a processor, the set of instructions operable to:
    deploy a plurality of access ports in a facility using a published layout configuration that depends on a type of the facility, wherein the layout is selected from a set of published layouts;
    receive at least one parameter from at least one of the plurality of access points; and
    dynamically determine settings of the plurality of access points based on the at least one parameter.

* * * * *